United States Patent [19]

Searle et al.

[11] Patent Number: 5,684,654

[45] Date of Patent: Nov. 4, 1997

[54] DEVICE AND METHOD FOR STORING AND RETRIEVING DATA

[75] Inventors: Nathan H. Searle, Snohomish; Allen E. Fleckenstein, Bellevue, both of Wash.

[73] Assignee: Advanced Digital Information System, Redmond, Wash.

[21] Appl. No.: 310,246

[22] Filed: Sep. 21, 1994

[51] Int. Cl.$^6$ ................................................ G11B 15/68
[52] U.S. Cl. ................................ 360/92; 369/36; 369/38
[58] Field of Search ............................ 360/92; 369/34, 369/36, 38, 178, 191, 192

[56] References Cited

U.S. PATENT DOCUMENTS

| | | | |
|---|---|---|---|
| 3,809,263 | 5/1974 | Dodd et al. | 214/16.4 R |
| 3,831,197 | 8/1974 | Beach et al. | 360/71 |
| 4,519,522 | 5/1985 | McElwee | 221/13 |
| 4,654,727 | 3/1987 | Blum et al. | 360/71 |
| 4,779,151 | 10/1988 | Lind et al. | 360/92 |
| 4,816,943 | 3/1989 | Tanaka et al. | 360/92 |
| 4,817,070 | 3/1989 | Hug et al. | 369/36 |
| 4,864,511 | 9/1989 | Moy et al. | 364/478 |
| 4,945,429 | 7/1990 | Munro et al. | 360/92 |
| 4,984,106 | 1/1991 | Herger et al. | 360/92 |
| 5,089,920 | 2/1992 | Bryer et al. | 360/92 |
| 5,157,564 | 10/1992 | Theobold et al. | 360/92 |
| 5,182,687 | 1/1993 | Campbell et al. | 360/92 |
| 5,235,474 | 8/1993 | Searle | 360/71 |
| 5,291,110 | 3/1994 | Andrews, Jr. et al. | 360/75 |

FOREIGN PATENT DOCUMENTS

| | | |
|---|---|---|
| 0 186 945-A1 | 7/1986 | European Pat. Off. . |
| 63-244440 | 10/1988 | Japan ................ 360/92 |

Primary Examiner—Robert S. Tupper
Assistant Examiner—William R. Korzuch
Attorney, Agent, or Firm—Seed and Berry LLP

[57] ABSTRACT

A data storage unit includes multiple media processors that are each moveable between a transfer position and a corresponding standby position, and are able to receive a storage medium. A shuttle assembly moves a selected one of the media processors between the transfer position and the corresponding standby position. A magazine is provided with a plurality of compartments that are each able to receive a storage medium. A magazine drive assembly moves the magazine so as to move a selected one of the compartments into the transfer position. A transfer assembly transfers a storage medium between the selected media processor and the selected compartment while the selected media processor and the selected compartment are in the transfer position. A controller controls the operations of the shuttle assembly, magazine drive assembly, and transfer assembly.

6 Claims, 8 Drawing Sheets

DEVICE AND METHOD FOR STORING AND RETRIEVING DATA

TECHNICAL FIELD

The invention relates generally to electro-mechanical devices and more specifically to a device for storing data in and retrieving data from a storage medium, such as magnetic tape.

BACKGROUND OF THE INVENTION

It is often desirable to store data, such as computer data, in an off-line storage medium, such as magnetic tape, that is housed in a case such as a cassette. Often, on-line storage media, such as a computer's hard disk, may lack sufficient space to store the desired amount of data. Typically, a significant portion of this desired data need not be accessed on a regular basis. Thus, such infrequently accessed data may be stored off line, and manually or automatically retrieved when needed.

U.S. Pat. No. 5,235,474, issued to Searle, discloses a device for storing data in and retrieving data from off-line tape cassettes. The device includes one or more removable magazines having a number of slots for storing a number of the cassettes, and a tape drive for reading data from and writing data to the cassettes. A drive assembly moves the magazine so that a selected slot is aligned with the opening of the tape drive, which remains stationary. Next, gripper arms transfer a cassette either from the tape drive to the selected slot, or from the selected slot to the tape drive. Typically, the computer to which the device is attached stores the identity of the magazine, the selected slot, and the stored data to facilitate subsequent retrieval of the tape cassette on which the data is stored.

However, there are some problems associated with the Searle device. For example, because it includes only one tape drive, the device may store and retrieve data too slowly for some applications, and lack the ability to perform functions such as an off-line copy. Also, because one accesses the magazine from the top of the device, the gripper arms sometimes hinder the installation and removal of the magazine. Furthermore, top installation and removal forces the magazine to be smaller and thus have fewer slots than a magazine that the device could otherwise accommodate. Additionally, the buttons used to secure the cassettes within the magazine slots may score and otherwise damage the cassettes over a period of time.

SUMMARY OF THE INVENTION

In accordance with the present invention, a data storage unit is provided that is usable with storage media. The storage unit includes multiple media processors that are each moveable between a transfer position and a corresponding standby position, and are able to receive a storage medium. A shuttle assembly moves a selected one of the media processors between the transfer position and the corresponding standby position. A magazine is provided with a plurality of compartments that are each able to receive a storage medium. A magazine drive assembly moves the magazine so as to move a selected one of the compartments into the transfer position. A transfer assembly transfers a storage medium between the selected media processor and the selected compartment while the selected media processor and the selected compartment are in the transfer position. A controller controls the operations of the shuttle assembly, magazine drive assembly, and transfer assembly.

In one aspect of the invention, the shuttle assembly moves the media processors together as a single entity. In another aspect of the invention, the storage unit includes two media processors. In still another aspect of the invention, the shuttle assembly includes a bell-crank assembly that imparts an approximately sinusoidal acceleration and deceleration to the media processors.

An advantage provided by one aspect of the invention is that it can store and retrieve data faster than existing off-line data storage devices, and can perform off-line copying of data.

An advantage provided by another aspect of the invention is that a storage magazine is loadable without hindrance from the transfer assembly.

An advantage provided by yet another aspect of the invention is that magazines usable therewith can be larger than magazines usable with existing devices.

An advantage provided by still another aspect of the invention is reduced scoring of the storage media by the retaining devices associated with each magazine compartment.

DETAILED DESCRIPTION OF THE INVENTION

Figure 1:
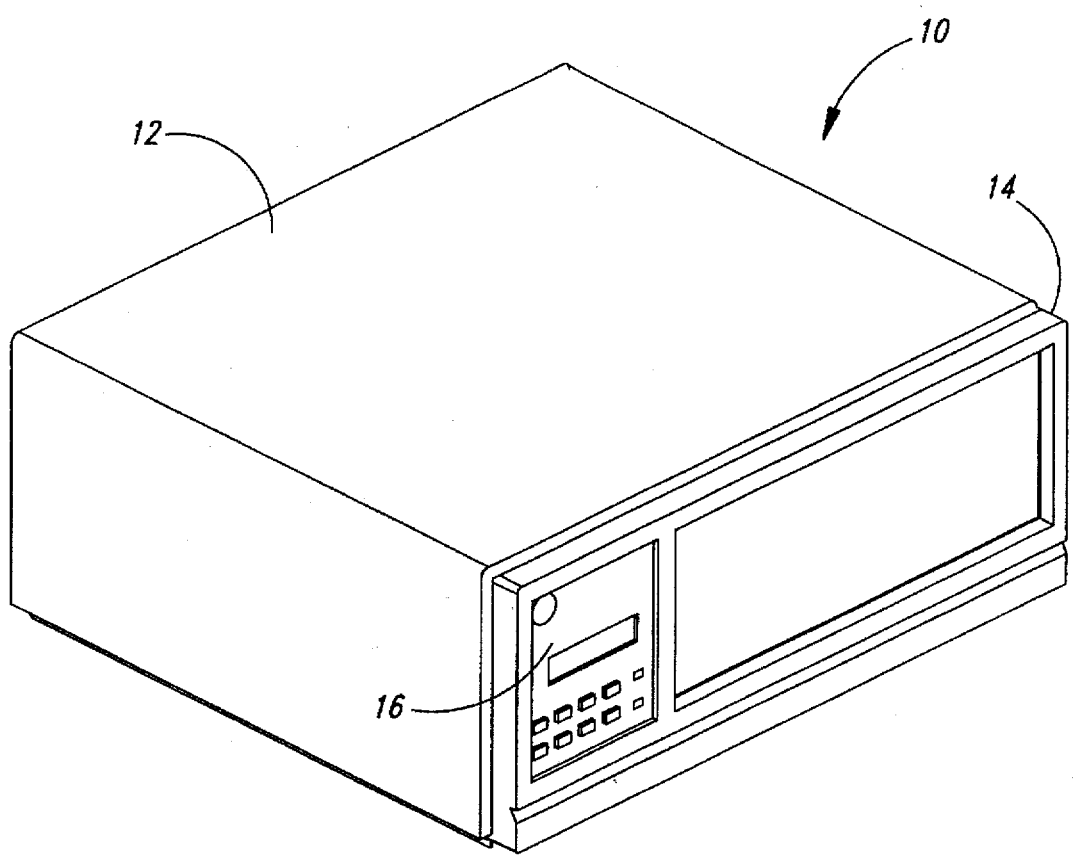
FIG. 1 is an isometric view of a storage unit according to the present invention.

FIG. 1 shows a computer storage unit 10 for storing computer files and other data external to, i.e., off line from, a computer system (not shown) with which storage unit 10 is used. Storage unit 10 includes a case 12, a front cover 14 that is releasably attached to case 12, and a control panel 16, which is discussed in more detail in conjunction with FIG. 7.

Figure 2:
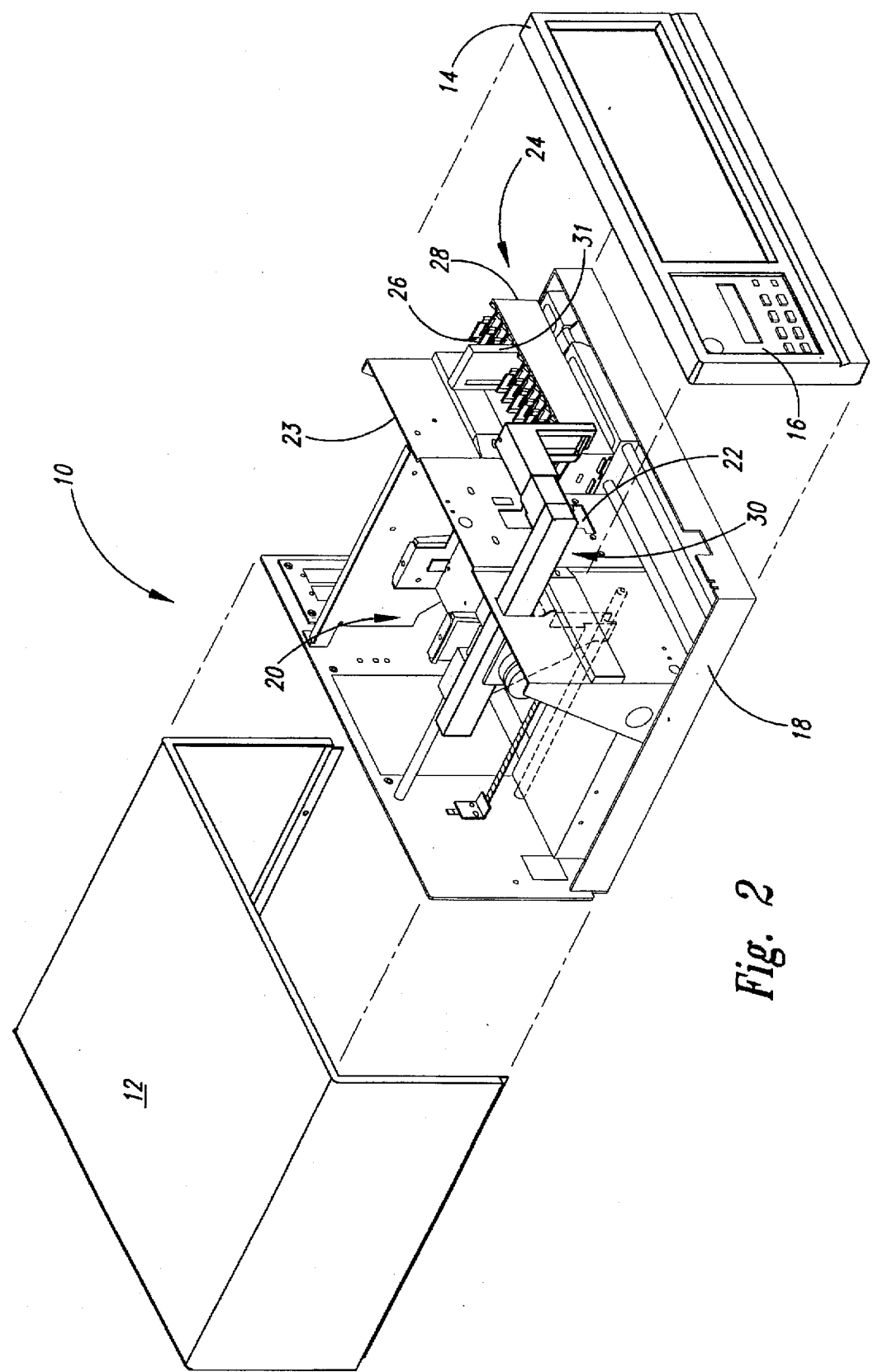
FIG. 2 is an exploded view of the storage unit of FIG. 1.

FIG. 2 is an exploded view of storage unit 10, which includes a frame 18 for supporting the internal components of unit 10. Unit 10 also includes a shuttle assembly 20 that is operable to move each of a pair of media processors 40a and 40b (FIGS. 3 and 5), such as tape drives, between a transfer position, with which an opening 22 in a divider plate 23 is aligned, and a corresponding standby position on either side of the transfer position. A magazine drive assembly 24 is operable to move each of compartments 26 of a storage-media magazine 28 into the transfer position. A transfer assembly 30 is operable to transfer a storage medium 31 such as a tape cassette between the compartment 26 and the media processor 40 that are in the transfer position. A controller 38 (FIG. 3) controls and monitors the operation of shuttle assembly 20, magazine drive assembly 24, and transfer assembly 30.

In operation, controller 38, in accordance with instructions received from the attached computer system, instructs shuttle assembly 20 to move a selected one of the media processors 40a and 40b into the transfer position, and also instructs magazine drive assembly 24 to move a selected compartment 26 into the transfer position as well. If the storage medium 31 is in the selected compartment 26, controller 38 instructs transfer assembly 30 to transfer the storage medium from the selected compartment 26 to the selected media processor. Alternatively, if the storage medium 31 is within the selected media processor 40a or 40b, controller 38 instructs transfer assembly 30 to transfer the storage medium from the selected media processor 40a to 40b or the selected storage compartment 26.

Thus, storage unit 10 provides increased data-transfer speed over existing storage devices by providing multiple media processors 40a and 40b. For example, while a storage-medium transfer is occurring relative to one media processor, the other media processor can be storing data on or retrieving data from another storage medium. Or, unit 10 can off-line copy the data stored on one storage medium directly to another storage medium without having to temporarily store the data on-line, i.e., in the attached computer system's memory. Furthermore, unit 10 can generate simultaneous back-up files by using two media processors to simultaneously write the same data to two different storage media. Additionally, by moving both the selected compartment 26 and the selected media processor into a single transfer position, transfer assembly 30 can be designed to move in a single dimension. Such single-dimension movement reduces the complexity of transfer assembly 30 from that of existing transfer assemblies designed to move in multiple dimensions.

Figure 3:
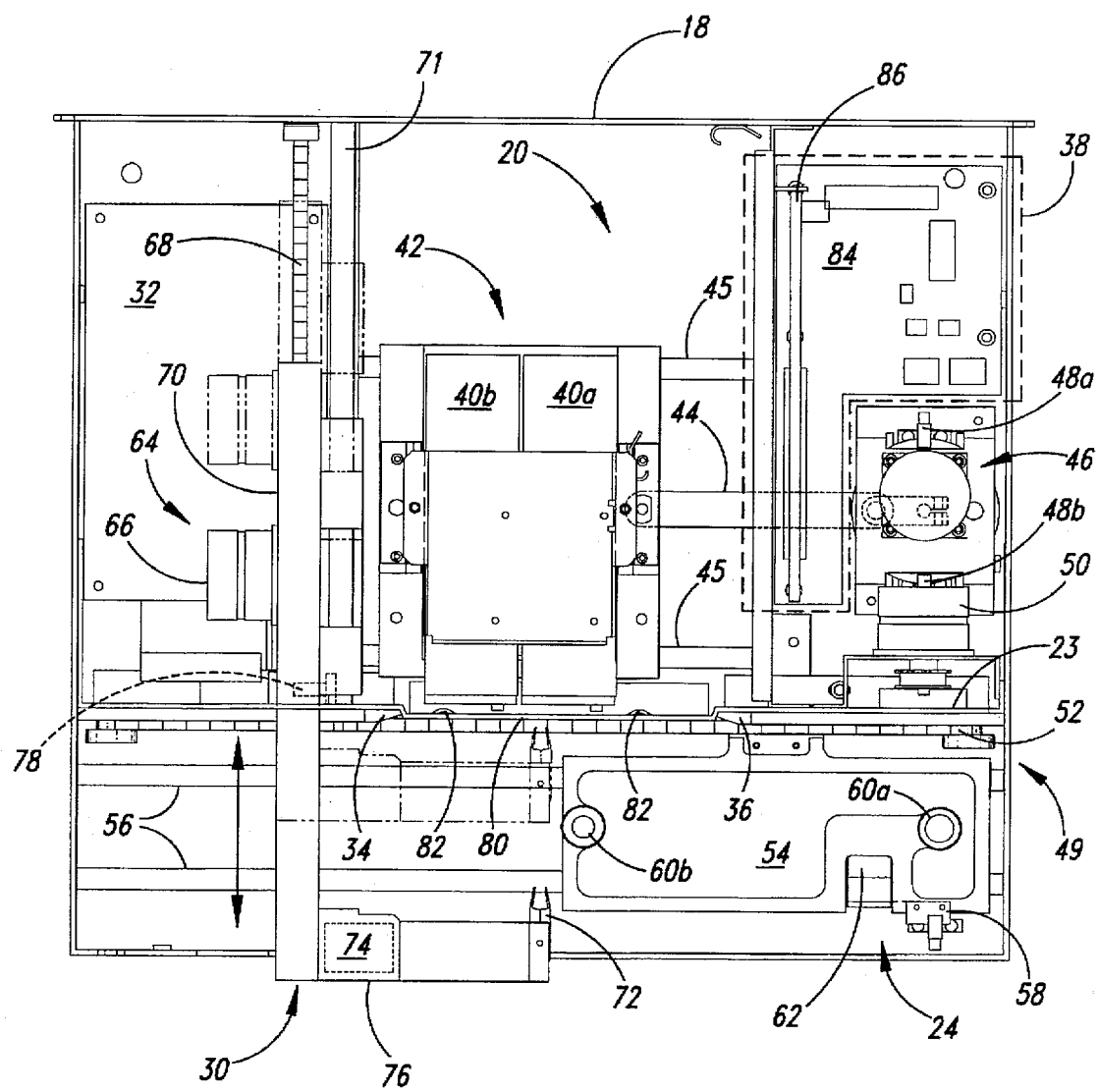
FIG. 3 is a top view of the storage unit of FIG. 1 with internal components exposed.

FIG. 3 is a top view of storage unit 10 with magazine 28 removed. Unit 10 further includes a power supply 32, optical-beam generator 34, optical-beam receiver 36, and the controller 38. As shown, shuttle assembly 20 includes the media processors 40a and 40b, a processor housing 42, a drive belt 44, shuttle rails 45, and a bell-crank assembly 46. Bell-crank assembly 46 includes optical sensors 48a and 48b, which indicate to controller 38 when one of the processors 40a and 40b is in the transfer position. In operation, bell-crank assembly 46 imparts a sinusoidal or approximately sinusoidal acceleration and deceleration to processors 40a and 40b. Such motion is smooth enough to allow the processors 40 to read from and write to a storage medium while bell-crank assembly 46 is moving the processors to or from the transfer position. Shuttle assembly 20 is discussed further in conjunction with FIG. 6.

Magazine drive assembly 24 includes a carriage drive assembly 49, which includes a motor 50, a drive belt 52, a carriage 54, carriage rails 56, and an optical sensor 58. As discussed above, drive assembly 49 moves carriage 54 in response to a signal from controller 38 such that a selected compartment 26 (FIG. 2) is moved into the transfer position. Sensor 58, which is in communication with controller 38, senses when carriage 54 is in a home position, which carriage 54 occupies in FIG. 3. Upon power up of unit 10, drive assembly 49 moves carriage 54 into the home position, so movement of carriage 54 can begin from a known reference position. Carriage 54 includes protrusions 60a and 60b and latch 62 for releasably securing magazine 28 (FIG. 2) to carriage 54. Carriage 54 is discussed in more detail in conjunction with FIGS. 4 and 5.

Still referring to FIG. 3, transfer assembly 30 includes a traveler drive assembly 64, which includes a motor 66 and drive belt 68, a traveler arm 70, a traveler rail 71, gripper arms 72, a gripper arm motor 74 shown in phantom and housed within housing 76, and an optical sensor 78 also shown in phantom. The gripper arm position drawn in solid is the home or store-retrieve position in which transfer assembly 30 is placing a storage medium into or removing a storage medium from a selected compartment 26 (FIG. 2). Sensor 78, which is in communication with controller 38, determines when transfer assembly 30 is in the home position. During normal operation, controller 38 allows the operation of carriage drive assembly 49 only when transfer assembly 30 is in the home position. During a transfer of a storage medium 31 (FIG. 2) from a selected compartment 26, motor 74 opens and closes gripper arms 72 such that they grasp storage medium 31. Next, drive assembly 64 moves gripper arms 72 through the intermediate position shown in phantom into a load-unload position (not shown), in which the edge 80 of housing 76 abuts or approximately abuts divider 23, to insert storage medium 31 into the selected processor, shown in FIG. 3 as processor 40a. Motor 74 then opens gripper arms 72, drive assembly 64 moves arms 72 slightly toward the home position, motor 74 closes arms 72, and drive assembly 64 moves closed arms 72 back toward processor 40a to fully insert the storage medium into processor 40a. Controller 38 then instructs drive assembly 64 to move gripper arms 72 back into the home position. During the transfer of a storage medium 31 from the processor 40a to a compartment 26, motor 74 opens gripper arms 72 and drive assembly 64 moves gripper arms 72 into the load-unload position. Motor 74 then closes gripper arms 72 to grasp the ejected storage medium 31. Drive assembly 64 then moves gripper arms 72 into the home position and motor 74 opens gripper arms 72 to release the storage medium 31 into the selected compartment 26. The same process is used when moving a storage medium between the processor 40b and a compartment 26.

Still referring to FIG. 3, divider plate 23, which extends along the channel or space between processors 40a and 40b and carriage 54 (and magazine 28 when installed) includes a center portion 80, which protrudes away from the processors 40a and 40b. Center portion 80 includes dimples or protrusions 82 that protrude toward the processors 40a and 40b and are in or are approximately in the respective standby positions of the processors 40a and 40b. In one mode of operation, generator 34 generates an optical beam parallel to center portion 80 and between center portion 80 and the processors 40a and 40b. When a storage medium is ejected from one of the processors, it breaks the optical beam. Controller 38 senses this break and initiates an unload sequence as describe above. However, dimples 82 prevent an ejected storage medium 31 from breaking the beam when the respective processor is in its standby position. Thus, controller 38 will not initiate an unload sequence until the respective processor is moved from its standby position. This mode of operation is suitable for media processors 40a and 40b, such as a 4 mm tape drive manufactured by Hewlett Packard, that eject their respective storage media only a distance of approximately 3/16". In a second mode of operation, generator 34 generates the optical beam between center portion 80 and carriage 54 (and magazine 28 when installed). In this mode, center portion 80 itself prevents an ejected storage medium from breaking the beam until the ejecting processor is in the transfer position, and the ejected storage medium 31 can extend through slot 22 (FIG. 2). Such a mode is suitable for processors that eject a storage medium 31 approximately ½" or more. During either of the two described modes of operation, controller 38 monitors the beam during a load of a storage medium 31 into one of the processors 40a or 40b. When the beam becomes unbroken, controller 38 detects that the storage medium has been loaded into the selected processor 40a or 40b.

As shown in FIG. 3, controller 38 includes a mother circuit board 84 and a controller circuit board 86. Boards 84 and 86 may share the control functions, or controller board 86 may alone perform the control functions. Controller 38 communicates with the attached computer system through a Standard Computer System Interface (SCSI)-2 or other communication means.

Figure 4:
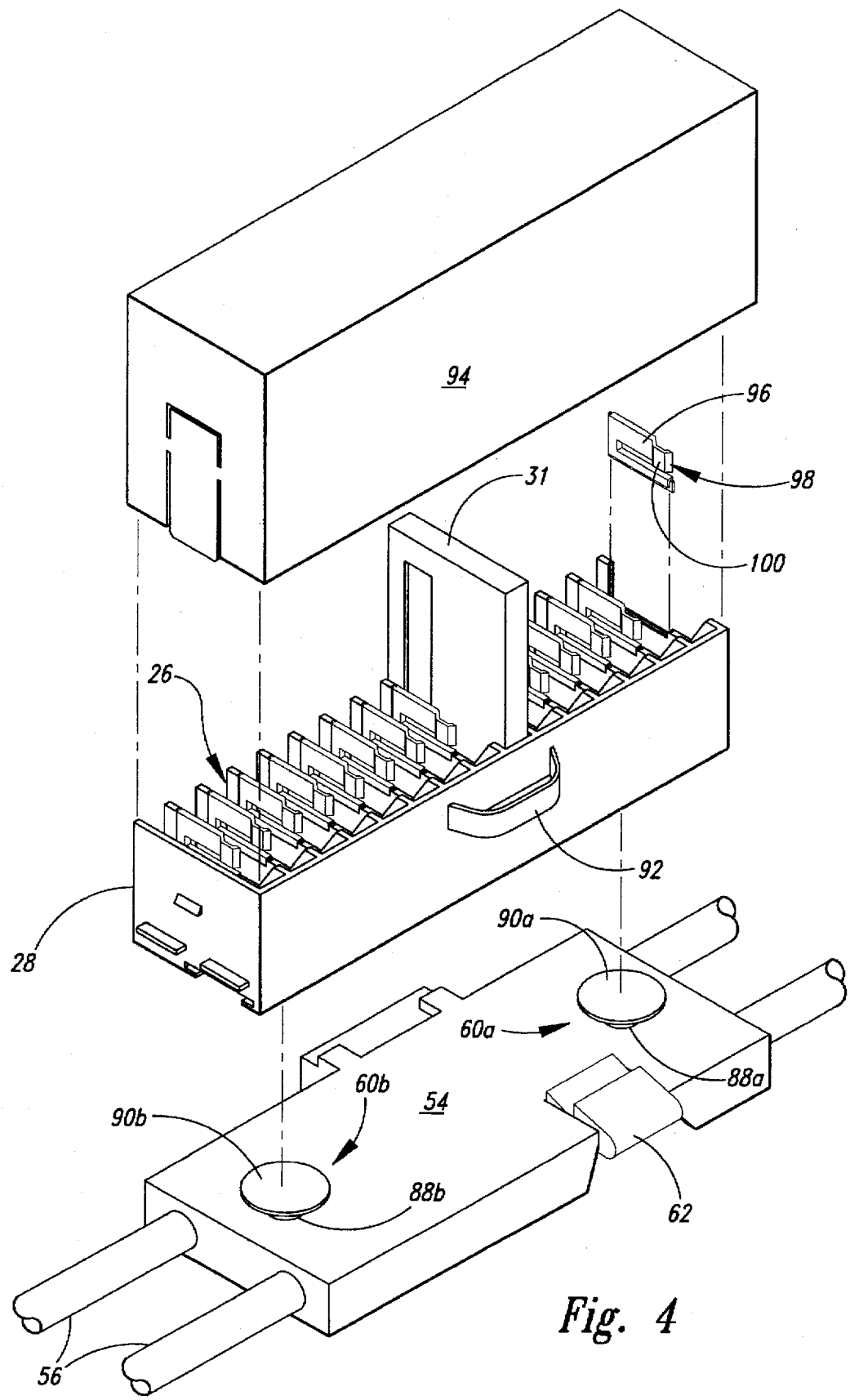
FIG. 4 is an enlarged, top exploded view of portions of the magazine drive assembly of FIG. 3 showing a magazine.

FIG. 4 is a perspective view of the upper portions of carriage 54 and magazine 28. Protrusions 60a and 60b each have a cylindrical body 88a and 88b and a flat head 90a and 90b adjacent a respective cylindrical body 88. Heads 90 have a diameter that is substantially greater than the diameter of bodies 88a and 88b. As discussed above and below in conjunction with FIG. 5, protrusions 60a and 60b engage slots on the bottom of magazine 28 to securely but removably hold magazine 28 to carriage 54.

Still referring to FIG. 4, a handle 92 facilitates installation and removal of magazine 28. A cover 94 protects the storage media from environmental contaminants such as dust during storage of magazine 28. Cover 94 is removed before magazine 28 is installed in storage unit 10. Each compartment 26 includes a removable holder or spring clip 96 that holds a storage medium 31 securely within a respective compartment 26, but yet allows transfer assembly 30 (FIGS. 2 and 3) to remove the storage medium 31 from the compartment 26. Each clip 96 includes an engaging portion 98 that applies a distributed force or pressure to the storage medium 31 along a face 100. Such a distributed pressure prevents scoring and other damage that existing holders may do to a storage medium 31. Although molded as a separate piece and shown removed, clips 96 may be permanently installed in the positions shown. Furthermore, although storage medium 31 is shown as a magnetic-tape cassette, other storage devices may be used, including a magnetic or "floppy" disk, digital audio tape (DAT), compact disk (CD), laser disk, and other optical, magnetic, and electronic storage media. The dimensions of storage compartments 26 would be adjusted accordingly to accommodate such different storage media. Moreover, although only one storage medium 31 is shown in magazine 28, the invention contemplates any number of storage media up to the full capacity of magazine 28.

Figure 5:
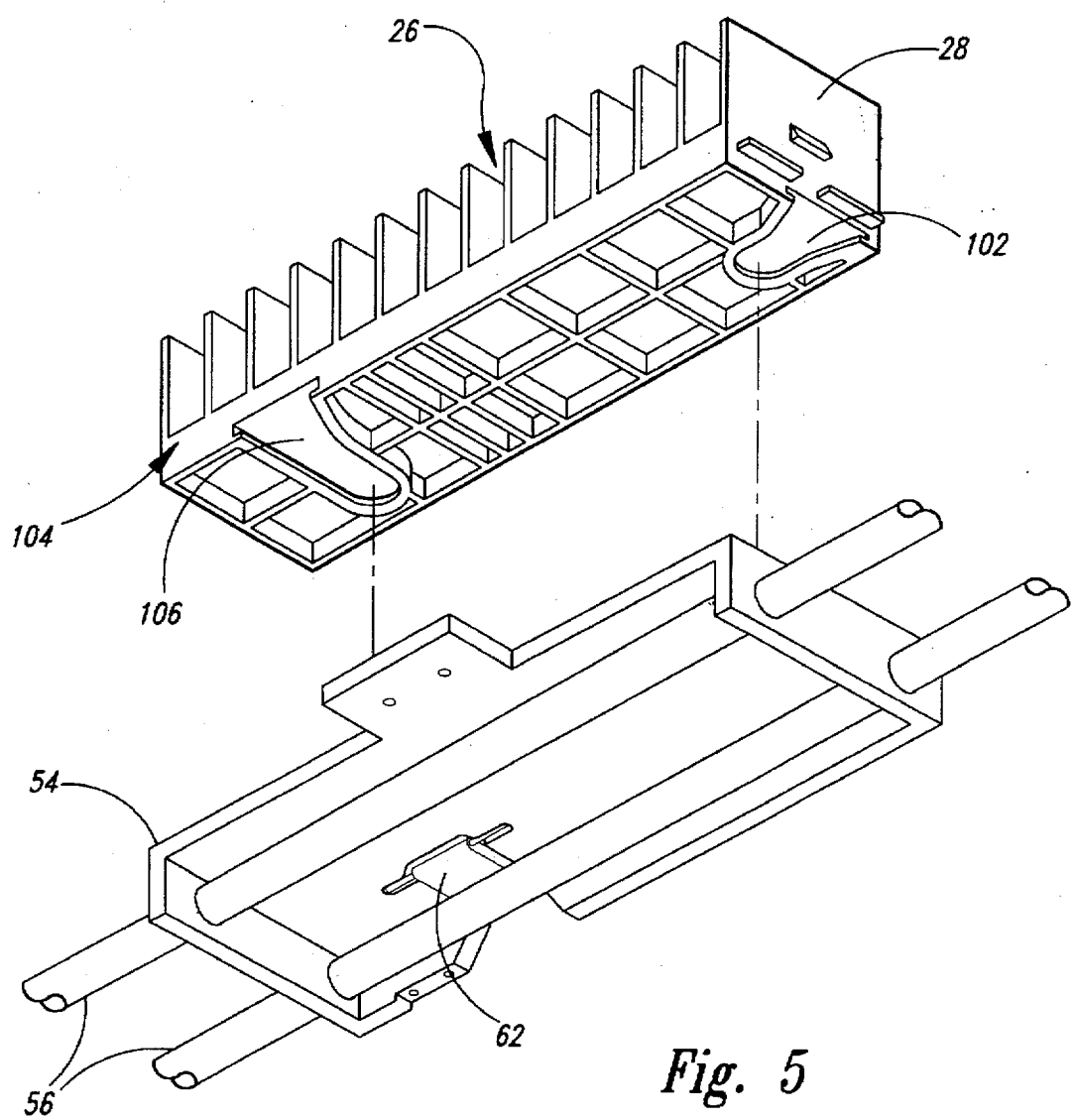
FIG. 5 is an enlarged, bottom exploded view of portions of the magazine drive assembly of FIG. 3 showing a magazine.

FIG. 5 is an isometric view of the bottom portions of carriage 54 and magazine 28. As shown, magazine 28 has a tapered first slot 102, which opens in a lateral direction, i.e., perpendicularly to front 104 of magazine 28, and is located at one end of magazine 28. A tapered second slot 106, which is a lateral distance away from first slot 102 approximate the other end of magazine 28, opens towards front 104 of magazine 28, as do compartments 26. For clarity, holders 96 are not shown.

The installation of magazine 28 onto carriage 54 is as follows. After carriage 54 is moved into the home position, cover 14 is removed from storage unit 10 and cover 94 is removed from magazine 28. Magazine 28 is then front loaded onto carriage 54. First, magazine 28 is rotated such that the opening of the first slot 102 is directed toward protrusion 60b (FIG. 4). Next, magazine 28 is maneuvered such that slot 102 fully engages head 90b of protrusion 60b. Then, magazine 28 is rotated counterclockwise (when viewed from above) until slot 106 fully engages head 90a of protrusion 60a and latch 62 snaps to lock magazine 28 in place on the carriage 54. For removal, latch 62 is released and the installation procedure is reversed. Thus, this slot-protrusion structure allows a user to front load magazine 28, as opposed to existing devices, which may require a more difficult top load. Furthermore, such a structure allows magazine 28 to be larger, and thus have more compartments 26 than existing magazines, because a front installation allows magazine 28 to be inserted partially behind gripper arms 72 (FIG. 3) during the installation before being rotated into the locked position, whereas a top installation does not.

Figure 6:
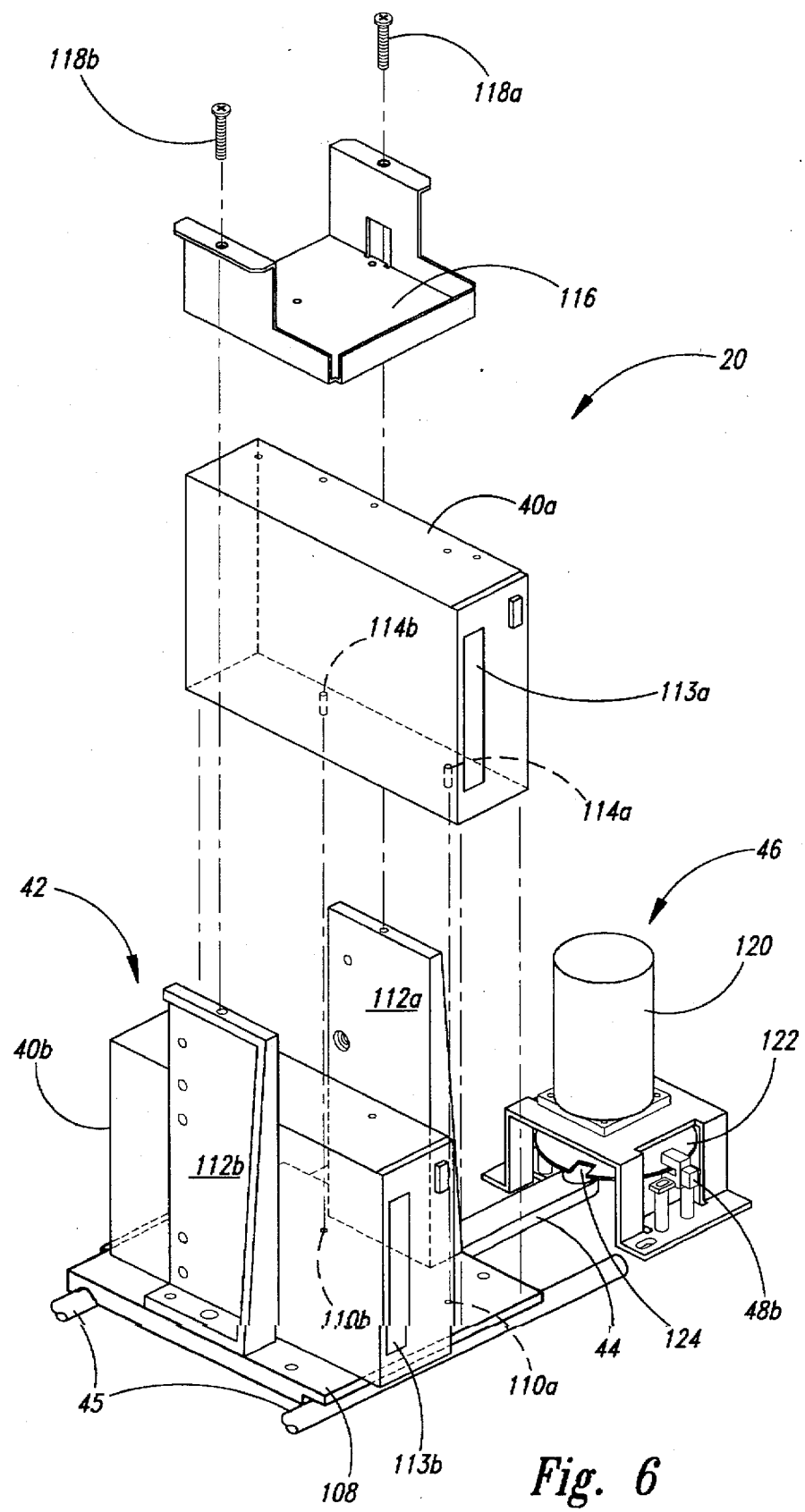
FIG. 6 is an enlarged, exploded view of the shuttle assembly of FIG. 3.

FIG. 6 is a perspective view of processor drive assembly 20. As shown, housing 42 includes a bottom plate 108 having alignment openings 110a and 110b therethrough. Bottom plate 108 is coupled to rails 45 and supports media processors 40a and 40b. Side supports 112a and 112b are coupled to bottom plate 108. Media processors 40a and 40b, which each have a respective opening 113a and 113b for receiving a storage medium 31 and alignment pins 114a amd 114b extending therefrom, are inserted between side supports 112a and 112 such that alignment pins 114a and 114b engage alignment openings 110a and 110b as shown. A top plate 116 is inserted over processors 40a and 40b and coupled to side supports 112a and 112b with screws 118a and 118b to hold processors 40a and 40b in place. Although shown for holding two processors 40, it is within the spirit and scope of the invention to increase the dimensions of housing 42 and storage unit 10 such that unit 10 can operate with three or more media processors 40. Furthermore, by changing the programming of controller 38, unit 10 can operate with less than the maximum number of processors 40 installed.

Still referring to FIG. 6, bell-crank assembly includes a motor 120 and a position disk 122 having a slot 124 therethrough. When slot 124 is aligned with one of the sensors 48a or 48b, controller 38 senses that the opening 113a or 113b of a corresponding media processor 40a or 40b is in the transfer position. For example, when slot 124 is aligned with sensor 48b, controller 38 senses that opening 113b of processor 40b is in the transfer position. Likewise, when slot 124 is aligned with sensor 48a (FIG. 3), controller 38 senses that opening 113a of processor 40a is in the transfer position. Thus, in response to a signal from controller 38, motor 120 makes ½ of a revolution (such that slot 124 moves between sensors 48a and 48b) each time controller 38 instructs shuttle assembly 20 to move a processor 40a or 40b from its respective standby position to the transfer position. Although shown as moving processors 40a and 40b in unison, it is within the spirit and scope of the invention to provide a shuttle assembly 20 that can move processors 40a and 40b independently to and from the transfer position.

Furthermore, although shown here as magnetic-tape drives, media processors 40a and 40b may be any type of drive suitable to process the desired storage medium 31, as discussed above. For example, processors 40a and 40b may include magnetic-disk drives, CD and other optical disk processors, and other types of media drives. Additionally, the present invention contemplates having one media processor 40 of one type, and another media processor of another type.

Figure 7:
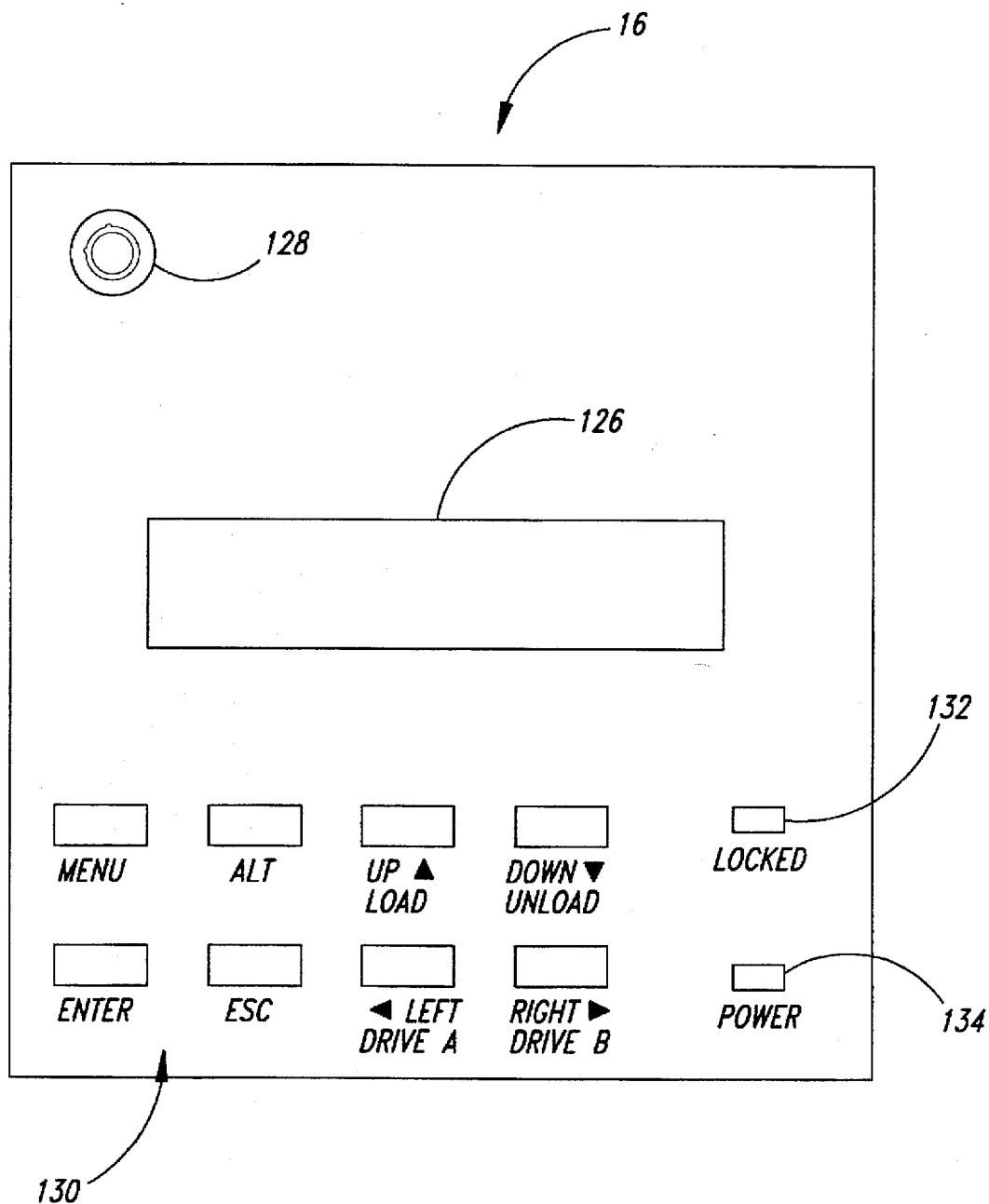
FIG. 7 shows an enlarged, front view of a front panel of the storage unit of FIG. 1.

FIG. 7 is a view of front control panel 16, which includes a liquid crystal display (LCD) 126, a lock 128, a key pad 130, and light-emitting diodes (LEDs) 132 and 134. LCD 126 shows the current status of unit 10, allows access to change operating features of unit 10, and displays error messages. Power LED 134 illuminates when the power to unit 10 is "on". Locked LED 132 illuminates when cover 14 (FIG. 1 ) is locked. During a locked condition, access to the magazine 28 and processors 40a and 40b is prevented, and only status information is accessible from key pad 130. TABLE I describes the functions of the keys composing key pad 130.

TABLE I

| | |
|---|---|
| MENU | Enters or exits the Off-Line mode menus. |
| ALT | Selects an alternate function for another key. |
| UP | Selects a previous item or value in the menu. |
| LOAD | Press ALT and then LOAD to initiate the magazine load program, during which unit 10 checks to see that all compartments 26 contain a storage medium 31 (if not, will make note of which compartments 26 are empty) and that all present storage media 31 can be inserted correctly into a media processor 40. |
| DOWN | Selects the next item or value in the menu. |
| UNLOAD | Press ALT then UNLOAD td initiate the unload program, during which unit 10 returns magazine 28 to the unload position. |
| ENTER | Selects currently displayed menu item. Press ALT then ENTER to clear any displayed error messages. |
| ESC | Exits current menu and returns to the previous menu. |
| LEFT | Scrolls a message display to the left or selects a previous field on the same line. |
| DRIVE A | Press ALT then DRIVE A to select media processor 40a. |
| RIGHT | Scrolls a message display to the right or selects the next field on the same line. |
| DRIVE B | Press ALT then DRIVE B to select media processor 40b. |

Figure 8:
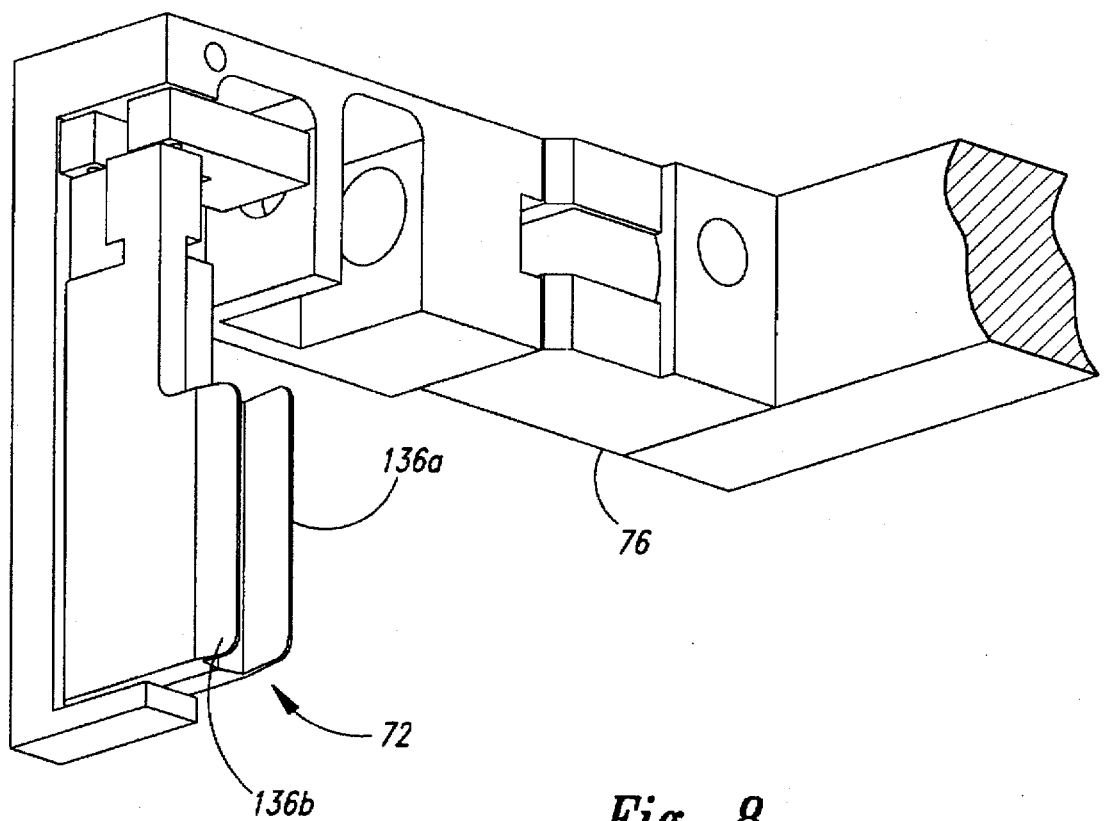
FIG. 8 is an enlarged, isometric view of the gripper arms of FIG. 3.

FIG. 8 shows gripper arms 72 of FIG. 3. Gripper arms 72 each include a respective finger segment 136a and 136b, which here are shown in a closed position. Although a space remains between the fingers 136a and 136b in the closed position, the width of the space is sufficiently small to allow fingers 136a and 136b to securely grasp the desired type of storage medium 31, and while in a closed position, load the storage medium 31 into a media processor 40a and 40b by pushing the inserted storage medium 31 into the media processor until it is fully loaded therein. In an open position (not shown), the space between fingers 136a and 136b is sufficiently large to allow fingers 136a and 136b to engage the storage medium before closing to clamp the storage medium therebetween. Because fingers 136a and 136b are formed from a hard material such as metal, and because gripper arm motor 74 (FIG. 3) can close fingers 136a and 136b with a force greater than that of existing actuator devices such as a solenoid, fingers 136a and 136b can grasp a storage medium 31 more securely than can existing gripper assemblies. This more secure grasping reduces the number of gripping steps required during an unload of a storage medium from a media processor 40a or 40b. For example, when a storage medium is first ejected from a processor 40, only a small portion (typically between 3/16" and 1/2") extends therefrom. Some existing gripper devices must first make a partial grip to remove a larger portion of the storage medium from the processor, and then make a full grip to remove the storage medium fully from the media processor and transfer it to a storage compartment. Unlike existing gripper devices, motor 74 closes fingers 136a and 136b with sufficient force, and fingers 136a and 136b are strong enough so they retain their shape during the application of such force, so that even a partial grip is sufficient to fully remove the storage medium from the media processor and return it to a storage compartment in the magazine.

It will be appreciated that, although a specific embodiment of the invention has been described herein for purposes of illustration, various modifications may be made without departing from the spirit and scope of the invention. Accordingly, the invention is not limited except as by the appended claims.

We claim:

1. A data storage unit useable with storage media, comprising:

multiple media processors each moveable between a transfer position and a corresponding standby position, and each operable to receive one of said storage media;

a shuttle assembly operable to move a selected one of said media processors between said transfer position and said corresponding standby position;

a magazine having a plurality of compartments that each open in a front direction and are each operable to receive one of said storage media, said magazine also having a lateral direction that is substantially perpendicular to said front direction, a first slot that opens substantially in said lateral direction, and a second slot that is spaced a distance from said first slot in said lateral direction and that opens substantially in said front direction;

a magazine drive assembly operable to move said magazine so as to move a selected one of said compartments into said transfer position, said magazine drive assembly having first and second protrusions extending therefrom, said magazine operable to be installed onto said magazine drive assembly by engaging said first slot with said first protrusion and then rotating said magazine to engage said second slot with said second protrusion;

a transfer assembly operable to transfer one of said storage media between said selected media processor and said selected compartment while said selected media processor and said selected compartment are in said transfer position; and a controller operable to control said shuttle assembly, said magazine drive assembly, and said transfer assembly.

2. A data storage unit usable with storage media, comprising:

multiple media processors each moveable between a transfer position and a corresponding standby position, and each operable to receive one of said storage media;

a shuttle assembly operable to move a selected one of said media processors between said transfer position and said corresponding standby position;

a magazine having a plurality of compartments each operable to receive one of said storage media;

a magazine drive assembly operable to move said magazine so as to move a selected one of said compartments into said transfer position;

a transfer assembly operable to transfer one of said storage media between said selected media processor and said selected compartment while said selected media processor and said selected compartment are in said transfer position;

a controller operable to control said shuttle assembly, said magazine drive assembly, and said transfer assembly; and a channel extending between said magazine and said media processors;

a generator operable to direct an optical beam along said channel;

a divider positioned along said channel and having an opening at said transfer position, said divider having protrusions operable to prevent a storage media that is ejected from a media processor from breaking said optical beam when said media processor is beyond said transfer position; and wherein said controller senses when one of said storage media breaks said optical beam.

3. A computer storage unit usable with storage-media cassettes, comprising:

a pair of cassette processors each moveable between a transfer position and a corresponding standby position, each having an opening operable to receive one of said cassettes, and each operable to read data from and write data to said one of said cassettes;

a shuttle assembly operable to move a selected one of said cassette processors between said transfer position and said corresponding standby position;

a carriage having first and second protrusions extending therefrom;

a magazine releasably attachable to said carriage and having a plurality of compartments that each open in a front direction and that are each operable to receive one of said cassettes, said magazine having a first slot that opens in a lateral direction that is substantially perpendicular to said front direction, said magazine having a second slot that is spaced a distance from said first slot in said lateral direction and that opens substantially in said front direction, said magazine operable to be attached to said carriage by engaging said first slot with said first protrusion and then rotating said magazine to engage said second slot with said second protrusion;

a carriage drive assembly operable to move said carriage so as to move a selected one of said compartments into said transfer position;

a transfer assembly operable to transfer one of said cassettes between said selected cassette processor and said selected compartment while said selected cassette processor and said selected compartment are in said transfer portion; and a controller operable to control said shuttle assembly, said carriage drive assembly, and said transfer assembly.

4. A computer storage unit usable with tape cassettes, comprising:

a pair of cassette processors each moveable between a transfer position and a corresponding standby position, each having an opening operable to receive one of said cassettes therein, and each operable to read data from and write data to one of said cassettes received therein;

a shuttle assembly operable to move a selected one of said cassette processors between said transfer position and said corresponding standby position;

a carriage having first and second pins extending therefrom, each of said pins having a substantially flat head with a first diameter and a substantially cylindrical body with a second diameter that is smaller than said first diameter;

a magazine releasably attachable to said carriage and having a plurality of compartments that each open in a front direction and that are each operable to receive one of said cassettes, said magazine having a lateral direction that is substantially perpendicular to said front direction, said magazine including a first slot that opens in substantially said lateral direction and a second slot that is spaced a distance from said first slot in said lateral direction and that opens substantially in said front direction, said magazine operable to be installed onto said carriage by engaging said first slot with said head of said first pin and then rotating said magazine to engage said second slot with said head of said second pin;

a carriage drive assembly operable to move said carriage so as to move a selected one of said compartments into said transfer position;

a pair of rotatable gripper arms;

a traveler for supporting said gripper arms in said transfer position;

a traveler drive assembly operable to move said traveler so as to move said gripper arms between a load-unload position and a retrieve-store position;

a motor mounted to said traveler and operable to selectively rotate said gripper arms between grasping, loading, and releasing positions such that said gripper arms are operable to load one of said cassettes into and unload said received cassette from said selected media processor while said selected media processor is in said transfer position and while said gripper arms are in said load-unload position and to retrieve said received cassette from and store said received cassette in said selected compartment while said selected compartment is in said transfer position and while said gripper arms are in said retrieve-store position; and a controller operable to control said shuttle assembly, said carriage drive assembly, said traveler drive assembly, and said motor.

5. A computer storage unit usable with tape cassettes, comprising:

a pair of cassette processors each moveable between a transfer position and a corresponding standby position, each having an opening operable to receive one of said cassettes therein, and each operable to read data from and write data to one of said cassettes received therein;

a shuttle assembly operable to move a selected one of said cassette processors between said transfer position and said corresponding standby position;

a carriage;

a magazine releasably attachable to said carriage and having a plurality of compartments each operable to receive one of said cassettes;

a carriage drive assembly operable to move said carriage so as to move a selected one of said compartments into said transfer position;

a pair of rotatable gripper arms;

a traveler for supporting said gripper arms in said transfer position;

a traveler drive assembly operable to move said traveler so as to move said gripper arms between a load-unload position and a retrieve-store position;

a motor mounted to said traveler and operable to selectively rotate said gripper arms between grasping, loading, and releasing positions such that said gripper arms are operable to load one of said cassettes into and unload said received cassette from said selected media processor while said selected media processor is in said transfer position and while said gripper arms are in said load-unload position and to retrieve said received cassette from and store said received cassette in said selected compartment while said selected compartment is in said transfer position and while said gripper arms are in said retrieve-store position;

a channel extending between said magazine and said media processors;

a generator positioned at one end of said channel and operable to direct an optical beam along said channel and across said openings of said cassette processors;

a receiver positioned at an opposing end of said channel, in communication with said controller, and operable to receive said optical beam;

a divider plate extending along said channel between said optical beam and said magazine and having an opening therethrough at said transfer position, said divider plate defining protrusions extending toward said cassette processors and operable to prevent a cassette ejected from one of said cassette processors from breaking said optical beam while said opening of said cassette processor is beyond said transfer position; and a controller operable to control said shuttle assembly, said carriage drive assembly, said traveler drive assembly, and said motor, and to sense when a cassette breaks said optical beam.

6. A method for storing and retrieving data, comprising:

providing multiple media processors each moveable between a transfer position and a corresponding standby position, and each having an opening operable to receive a storage medium;

moving a selected one of said media processors into said transfer position;

providing a magazine having a plurality of compartments each operable to receive said storage medium;

moving a selected one of said compartments into said transfer position;

transferring said storage medium between said selected media processor in said transfer position and said selected compartment in said transfer position;

directing an optical beam across said openings of said media processors;

detecting when said storage medium breaks said optical beam; and providing a member positioned to prevent said storage medium from breaking said optical beam when said storage medium is ejected from a media processor that is located beyond said transfer position.

* * * * *